Patented May 31, 1949

2,471,887

UNITED STATES PATENT OFFICE 2,471,887

STABILIZED POLYMER

Joseph F. Nelson, Elizabeth, N. J., assignor to Standard Oil Development Company, a corporation of Delaware No Drawing. Application August 21, 1945, Serial No. 611,909

4 Claims. (Cl. 260—93)

This invention relates to high molecular weight copolymers containing low, controlled amounts of chemical unsaturation; relates particularly to the protection of the molecular weight; and tensile strength after curing, of low unsaturation olefinic copolymers; and relates especially to compositions of matter containing isobutylene or other mono-olefin copolymerized to a high molecular weight with a material to provide a low but substantial amount of unsaturation in the molecule, together with a polyalkylated phenol as a protective agent.

It has been found possible to copolymerize isobutylene, and several other mono-olefins which are in effect substituted ethylenes, with multi-olefins such as butadiene, isoprene, dimethyl butadiene, dimethallyl, myrcene, and the like, into copolymers having molecular weights or molecular weight numbers (as determined by the Staudinger method) ranging from about 20,000 up to several hundred thousand; or actual molecular weights, as determined by osmotic pressure methods, ranging from 30,000 or 40,000 up to several million. The valuable characteristics of these polymers lie in large part in the high molecular weights which bring them into the category of highly elastic solids or rubber-like solids which have the property of cold flow, and the capability of a curing reaction with sulfur and analogous substances to yield a material in which the cold flow is destroyed and replaced with a definite, measurable tensile strength and an elongation at break ranging from 500% to 1200% and a tensile strength at break ranging from 1000 to 4500 pounds per square inch. However, both the curing reaction, the elongation at break, and the tensile strengths are functions of the molecular weight of the original polymer, and, to some extent, the chemical condition, perhaps freedom from combined oxygen of the original polymer. In the uncured state, however, these polymers show the undesirable properties of depolymerization and of oxidation, during storage, which effects result in a serious loss of tensile strength in the cured polymer or may even result in loss of the ability to cure to a solid material having a definite tensile strength. Since most of these polymers must be stored for a substantial length of time between the time of preparation and the time of use, the loss of molecular weight during storage is a serious detriment to the usefulness of these polymers.

According to the present invention, it is found that the addition to these polymers of a polyalkylated phenol greatly improves their storage capacity without injury to other properties of the polymers.

Thus, the present invention consists of a composition of matter in which the major component is a high molecular weight copolymer of a mono-olefin with a multi-olefin in which the molecular weight and chemical stability of the copolymer is protected and maintained by the presence therein of a small portion, ranging from 0.01% to about 5% of a polyalkylated phenol; which, in its preferred form, is a 2,6-di-tertiary butyl, 4 methyl phenol. Other objects and details of the invention will be apparent from the following description:

The raw material of the process and product of the present invention is a copolymer of a major proportion of a mono-olefin with a minor proportion of a multi-olefin, such as butadiene, isoprene, piperylene, dimethyl butadiene, dimethallyl, myrcene, and the like, having from 4 to 12 or 14 carbon atoms per molecule. The mono-olefin preferably is isobutylene but may also be a secondary substituted ethylene or isoolefin such as 2-methyl pentene 1, or 2-methyl hexene 1, or the like, up to 8 or 9 carbon atoms per molecule; or may be an aryl substituted ethylene such as styrene, alpha-methyl styrene, para-methyl styrene, alpha - methyl - para - methyl styrene, styrene type substances containing substituents having more than 1 carbon atom up to 5 or 6 carbon atoms; or halo-styrenes, or a styrene type compound containing both halogen and alkyl substituents.

This polymer is conveniently prepared by mixing together isobutylene and a multi-olefin such as butadiene, isoprene, piperylene, dimethylbutadiene, dimethallyl, myrcene, and the like. Any of the diolefins, triolefins or higher olefins having from 4 to 12 or 14 carbon atoms per molecule may be used, although the preferred multi-olefins are the diolefins such as isoprene, piperylene, cyclo-pentadiene and dimethylbutadiene. The isobutylene and multi-olefin material are mixed in any convenient proportion preferably within the range from 0.5 part of the multi-olefin with 99.5 parts of isobutylene, to 30 parts of the multi-olefin with 70 parts of isobutylene, both of from 90 to 99% purity. However, wider ranges of proportions are useful for some purposes, and for most purposes a major proportion of isobutylene with a minor proportion of the multi-olefin is useful. The minimum amount of multi-olefin which is significant and useful is, usually, about 0.2%. A diluent for the olefinic mixture may also be used in the mixture. These materials, either before or after mixing, are cooled to temperatures ranging from −40° C. down to −165° C., the preferred range being from −50° C. to −103° C. These temperatures are obtained either by the use of an appropriate refrigerant in a refrigerating jacket around a storage container or around the polymerization reactor, or by admixture of a suitable refrigerant directly with the olefinic mixture. Suitable refrigerants are liquid propane at −42° C., solid carbon dioxide at −78° C., liquid ethane at −88° C., or liquid ethylene at −103° C., with liquid methane at −164° C. usable in some instances.

The cold olefinic mixture is then polymerized by the addition thereto of an appropriate Friedel-Crafts catalyst. For the Friedel-Crafts catalyst any of the Friedel-Crafts catalysts shown by N. O. Calloway, in his article on the "Friedel-Crafts synthesis," printed in the issue of "Chemical Reviews," published for the American Chemical Society at Baltimore in 1935 in volume XVII, No. 3, the article beginning on page 327, the list being particularly well shown on page 375, may be used, depending, to some extent, however, upon the multi-olefin used. The preferred catalyst is aluminum chloride in solution in a low-freezing, non-complex forming solvent, or aluminum bromide or aluminum chloro-bromide in a similar low-freezing, non-complex forming solvent.

For the catalyst solvent, any of the lower alkyl mono- or poly-halogen substituted compounds are useful. The preferred solvents are ethyl or methyl chloride, but alkyl compounds up to 4 or 5 carbon atoms having one or more halogen substituents are useful as catalyst solvents. Aluminum bromide or the mixed aluminum bromo-chlorides show a substantial solubility in the lower hydrocarbons such as propane, butane, pentane, hexane, and the like, and such solvents, having up to 8, 9 or 10 carbon atoms are useful. Several of the Friedel-Crafts active metal halide substances disclosed by Calloway are similarly useful in similar or analogous solutions, including especially titanium tetrachloride, either as such, or in solution in a similar solvent; the list of solvents also including carbon disulfide and its analogs. Uranium chloride also is a particularly useful catalyst. Thus the catalyst solvent is any liquid which dissolves a substantial amount of Friedel-Crafts catalyst, has a freezing point below 0° F., thereby being low-freezing, and boils away from the Friedel-Crafts catalyst with a negligible rise in temperature of less than 1 or 2 degrees over the boiling point of the pure solvent, thereby being non-complex-forming.

The reaction mixture may consist of the mixed olefins alone, or it may consist of the mixed olefins, two or more in number, with a diluent or a diluent refrigerant. For the diluent, such substances as ethyl, methyl, or propyl chloride or carbon disulfide, or carbon dioxide or the lower boiling hydrocarbons such as propane, butane, pentane, hexane, and the like, are useful. Usually, the presence of a diluent results in a slightly lower molecular weight, and a much lower amount of gelled material of low solubility in such hydrocarbons as tetralin, and the like; the low gel formation being conducive to better curing and smoother, and easier milling and processing.

The fluid catalyst is applied to the cold olefinic mixture in any convenient way which will obtain a rapid and effective dispersion of the catalyst into the olefinic material. That is, gaseous boron trifluoride may be bubbled through the rapidly stirred mixture. Liquid titanium tetrachloride or a dissolved catalyst may be delivered into the rapidly stirred reaction mixture in the form of a fine jet, preferably under high pressure; or any of the liquid catalysts may be applied to the surface of the rapidly stirred olefinic material in the form of a fine spray from a nebulizer.

The reaction proceeds promptly to yield the desired solid polymer which may have a molecular weight (according to the Staudinger method) ranging from 20,000 up to 250,000 and an iodine number (according to the Wijs method) ranging from 0.5 to about 50, depending upon the proportion of multi-olefin present; the preferred iodine number lying between about 1 and 20. It is desirable that both the molecular weight and the iodine number be maintained during storage, since both are essential for the subsequent curing reaction.

The resulting polymer is found to be reactive in a curing reaction with such substances as sulfur, especially in the presence of a sulfurization aid, such as a thiuram type compound, including Tuads (tetramethyl thiuram disulfide), Captax (mercaptobenzothiazole), Ethyl Tuads (tetraethyl thiuram disulfide), Butyl Tuads (tetrabutyl thiuram disulfide); Zimate (zinc dimethyldithiocarbamate), Butyl Zimate (zinc dibutyldithiocarbamate), Selenac (selenium diethyldithiocarbamate). Alternatively, such compounds as para-quinone dioxime or its homologs and analogs, or the dinitroso compounds such as dinitroso-cymene, dinitroso-naphthalene, dinitrosobenzene, and the like may also be used. This curing reaction yields an elastic limit, by destroying the property of cold flow characteristic of the uncured polymer, and yields a tensile strength at break which may range from 1000 pounds per square inch to 4000 or even 4500 pounds per square inch. The curing reaction usually requires the application of heat ranging from 235° F. to 350° F. for time intervals ranging from 2 or 3 minutes to several hours, depending upon the curing agent and the presence or absence of a curing aid and its character.

Still another polymer to which the present invention is applicable is the copolymer of a multi-olefin such as isoprene with a styrene type co-polymerizate. For this purpose, isoprene and styrene or a styrene type compound are mixed in any significant proportion, preferably ranging from 10 parts of isoprene with 90 parts of the styrene type compound to 95 parts of isoprene with 5 parts of the styrene type compound; significant amounts of either component being 1% or more. The mixture may also contain from 5% to 90% of isobutylene, provided there is present at least 1% of a multi-olefin, as above pointed out. This mixture is cooled, either before or after mixing to a temperature within the range between about −10° C. and −164° C., depending upon the proportion of the respective components and the molecular weight desired. A diluent may also be added if desired.

To the cold mixture there is then added a Friedel-Crafts catalyst, as above outlined in connection with the polymer of isobutylene and a polyolefin. The catalyst, as above disclosed, may be any Friedel-Crafts catalyst, prepared in fluid form, either by inherent characteristic or by solution in an appropriate, low-freezing, non-complex-forming solvent, as above disclosed (low-freezing being understood to mean having freezing point below that of water at 0° C., and, by non-complex-forming it is understood that the catalyst solvent boils away from the catalyst solid without significant change in boiling point from the boiling point of the pure solvent). In this instance, also, the polymerization proceeds promptly to yield the desired polymer. The characteristics of the polymer vary from a close approximation to those of pure polystyrene to a close approximation to those of pure polyisobutylene, with a range of intermediate characteristics, depending upon the proportions of the mixture. It may be noted that an actual copolymer is obtained by this procedure, and not a mixture of two separate polymers, and the characteristics of the resulting copolymer are not determined by algebraic addition of the characteristics of the simple polymers. This is especially so in view of the fact that pure polystyrene cannot be made to be elastic, and pure polyisobutylene cannot be made brittle at room temperatures, whereas the copolymer can be produced with a modified brittleness and a modified elasticity; characteristics unique to the copolymer and not otherwise obtainable.

The presence of isoprene or other multi-olefin in amounts ranging from 1% up to a major proportion results in the presence of sufficient unsaturation to permit of a curing reaction with sulfur, sulfurization aids, and the like, as above pointed out, regardless of the amount of isobutylene present in the copolymerizate, and, in addition, the presence of such an amount of unsaturation causes the polymer to be unstable both with respect to maintenance of molecular weight and to reaction with atmospheric oxygen.

In this instance also, the characteristics are a function of the molecular weight of the copolymer and therefore it is extremely desirable that the molecular weight be maintained during storage. This is accomplished by the process and composition of the present invention.

Still another raw material to which the invention is applicable is the tripolymer of isobutylene, styrene and a polyolefin. In preparing this copolymer, a mixture is made up consisting of isobutylene, styrene or a styrene type compound, as above outlined, and a multi-olefin having from 4 to 12 or 14 carbon atoms, as above outlined. This mixture likewise is cooled, either before or after mixing to a temperature between —10° C. and —164° C., and is copolymerized by the use of the same or similar catalysts to yield a polymer of modified brittleness or of modified elasticity which, in addition, contains sufficient residual unsaturation from the multi-olefin to be reactive with sulfur in a curing reaction, which still further modifies the physical properties, yielding an elastic limit and a greatly improved tensile strength.

These polymers show iodine numbers ranging from about 0.5 up to about 50, depending on the amount of multi-olefin or diolefin copolymerized. That is, a tripolymer prepared from a mixture of 60 parts styrene, 30 parts isobutylene and 3 parts isoprene may show an iodine number ranging from about 2 to about 13, depending upon the method of polymerization and the amount of gel formation. In solution, these polymers show intrinsic viscosities ranging from about 0.2 to 1.0 or somewhat higher. It may be noted that the intrinsic viscosity is related to molecular weight, and with the simple polymers such as simple polyisobutylene it has been maintained that a molecular weight determination could be made according to the Staudinger method. With these tripolymers, however, the Staudinger formula is much less surely applicable, and, while intrinsic viscosities within the above range suggest a Staudinger molecular weight number within the range between 6,000 or 7,000 and 30,000 or 40,000, the difference in chemical constitution and configuration makes the actual molecular weight distinctly uncertain, other than the indication that the polymer has a very large molecule. These tripolymers are readily cured by sulfur, preferably with Tuads or other of the curing agents above listed, and they are likewise readily cured by paraquinone dioxime and its analogs and homologs, preferably with lead oxide (PbO$_2$); or by the various dinitroso compounds. The tripolymer is a thermoplastic solid resin which can be calendered into thin, flexible sheets which are substantially strengthened by curing, as above indicated. In the uncured form, it has important adhesive properties which serve many valuable uses. The presence in the polymer of aromatic nuclei makes the polymer susceptible to most of the reactions which occur with aromatic substituents broadly, including nitration, sulfonation and many other well-known reactions. A tripolymer prepared from 40 parts of styrene, 50 parts of isobutylene, and 3 parts of isoprene, when compounded with 3 parts of sulfur and one part of Tuads, shows a tensile strength of approximately 1,000 pounds per square inch, and an elongation at break between 500% and 700%. By the addition of 50 parts of channel black per 100 parts of polymer, together with sulfur and Tuads, as above described, the material cured to a tensile strength of about 1500 pounds per square inch, without change in elongation at break. Thus the polymer component of the present invention is a strong and highly valuable structural material.

The second component of the invention, which is the molecular weight maintaining material, is a polyalkylated phenol which can be prepared by the procedure disclosed by Hyym E. Buc in his Patent Number 1,954,985, issued April 17, 1934. The preferred compound is a 2,6-di-tert.-butyl-4-methyl phenol having the following formula:

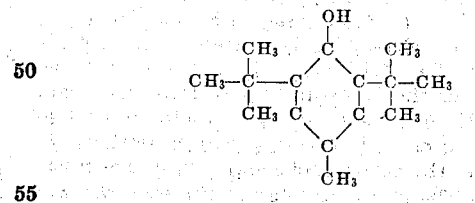

The above formula shows a methyl group in the para position and the tertiary butyl groups in the two ortho positions to the hydroxyl. However, a wide range of other compounds is similarly available: any alkyl radical up to 6 or 8 or more carbon atoms being satisfactory in the para position, and any tertiary alkyl group of from 4 to 6 or 8 carbon atoms being satisfactory in the ortho or 2 and 6 positions. One tertiary group in an ortho position is sufficient depending to some extent on the nature of the substituent, some being much better than others, the other ortho position being occupied by hydrogen or a simple alkyl radical or by a secondary or tertiary alkyl group. All of these compounds are readily prepared by the method shown in the above-mentioned Buc patent; to wit, by mixing together an alkyl-substituted phenol having an appropriate alkyl substituent with small amounts of strong sulfuric acid of from 93 to 100% concentration and adding thereto, slowly, an appropriate amount of a mono-olefin of the desired structure. As pointed out by Buc, the reaction proceeds promptly and easily, with cooling, if necessary, or with warming when the reaction is unduly slow, to yield a compound which is readily recovered to yield the desired multi-substituted phenol.

2,6-di-tertiary-butyl-4-methylphenol can also be prepared by adding tertiary butyl alcohol to a mixture of sulfuric acid and para-cresol maintained at 50° C. after separating from monoalkylated cresol, the dialkylated cresol is obtained as a solid.

EXAMPLE 1

A copolymer of isobutylene and isoprene was prepared, as above outlined, by mixing together 97 parts by weight of isobutylene of 98% purity with 3 parts by weight of isoprene of 96% purity. This material was diluted with approximately 300 parts by weight of liquid methyl chloride and cooled to a temperature in the neighborhood of −100° C., or a little below, by the application thereto of a bath containing liquid ethylene. To the cold mixture there was then added approximately 50 parts by weight of liquid methyl chloride containing dissolved therein approximately 0.15 part by weight of aluminum chloride.

The aluminum chloride solution was added in the form of a fine jet under high pressure, into the body of the rapidly stirred, cold, olefinic mixture. The polymerization reaction began immediately and proceeded rapidly to the stage of approximately 65% conversion of thet olefinic material into polymer; this amount of catalyst being insufficient to convert the whole of the olefinic material into polymer.

When the polymerization reaction had reached this stage, the reaction mixture was dumped into warm water to volatilize out the unpolymerized olefinic material, and the methyl chloride, and at the same time, to inactivate the aluminum chloride catalyst. The resulting polymer was separated from the water, placed on the open roll mill and milled on hot rolls to complete the removal of water and volatile material. The resulting polymer was found to have an intrinsic viscosity of approximatey 1.9, suggesting a Staudinger molecular weight number of approximately 60,000. (However, the many corrections required for the Staudinger determination make it difficult to be sure of the precise molecular weight, and osmotic pressure determinations indicate that the actual molecular weight was much higher.) The iodine number of the material was found to be approximately 2.3, indicating a relatively quite low unsaturation.

Simultaneously, a mixture was prepared consisting of approximately one mole of para-cresol and a small amount of 98% sulfuric acid. Into this mixture there were then bubbled slowly slightly more than 2 moles of gaseous isobutylene. The reaction proceeded promptly and the heat of reaction was removed by cooling the reactor. When a little more than the necessary 2 moles of isobutylene had been absorbed, the material was poured in a small stream into a substantial excess of cold water to dilute the sulfuric acid. The mixture was then refluxed gently for a period of some hours, at the end of which time the 2,6-di-tert.-butyl-4-methyl phenol was separated from the water, and washed with more water. The crude product was purified by recrystallization from a suitable solvent.

A portion of the polymer was taken and divided into two parts which were compounded according to the following two recipes:

| Components | Recipe I | Recipe II |
|---|---|---|
| | Parts | Parts by weight |
| Copolymer | 100 | 100 |
| Zinc oxide | 5 | 5 |
| Stearic Acid | 3 | 3 |
| Carbon Black | 50 | 50 |
| Sulfur | 3 | 3 |
| Tuads | 1 | 1 |
| Mercaptobenzothiazole | 0.5 | 0.5 |
| Polyalkyl phenol | 0 | 1 |

The two samples were cured at 307° F. for approximately 30 minutes and found to show for both recipes, tensile strengths of approximately 2900 pounds per sq. in., modulii at 300% elongation of approximately 500, and elongation at break of approximately 750%. These results showed that the polymer was of good grade, and the similarity between the results on the two recipes showed that the polyalkylated phenol, which, in this instance was the above-mentioned 2,6-di-tertiary-butyl, 4-methyl phenol, was harmless to the physical properties of the polymer.

Another portion of the polymer was then divided into two parts, into one of which there was added 1% of the polyalkylated phenol above-mentioned. The two samples were then placed in a dark oven through which a slow circulation of air occurred, at a temperature of 110° C. (+ or −1° C.) and kept there for approximately 800 hours. Intrinsic viscosity determinations were made at frequent intervals on small test specimens to indicate the change in molecular weight with the passage of time at this temperature.

(It has previously been determined that this hot oven test will show how well a given sample of polymer will stand upon storage. A polymer which will withstand 288 hours in the oven with no more than 10% loss in indicated Staudinger molecular weight number will lose no more than 10% of indicated molecular weight number in from 1 to 2 years of storage at room temperature; whereas, a polymer which loses a major portion of its molecular weight number in the air oven in a relatively short time will lose an appreciable amount in 1 to 2 years storage at room temperature.)

The polymer as placed in the oven had an intrinsic viscosity suggesting a molecular weight of approximately 60,000, both samples indicating closely the same molecular weight. The inspection results are shown in the following Table I:

Table I

| Hours in the air oven | Molecular Weight of Unprotected Polymer | Molecular Weight of Protected Polymer |
|---|---|---|
| 0 | 60,000 | 60,000 |
| 48 | 40,000 | 59,000 |
| 96 | 20,000 | 58,500 |
| 144 | 10,000 | 58,400 |
| 192 | 5,000 | 59,300 |
| 240 | 3,500 | 59,200 |
| 288 | 1,800 | 59,100 |
| 336 | 1,500 | 58,500 |
| 384 | 1,400 | 58,000 |
| 432 | 1,300 | 55,000 |
| 480 | 1,200 | 45,000 |
| 528 | 1,100 | 30,000 |

These results show the rapid degradation of molecular weight in the unprotected polymer and the excellent maintenance of molecular weight in the protected polymer. It should be noted, however, that the protective effect is not unlimited in time, since the protective agent apparently is gradually used up, and after a definite time limit, when the concentration of protective agent gets below some small amount, the deterioration of the polymer speeds up considerably. However, the length of time over which protection can be had is a function of the amount of protective agent added. If protection for a short time only is needed, it can be gotten by a fraction of 1% of protective agent, whereas if a greater length of time for protection is desired, amounts up to several percent of protective agent may be added.

It may be noted that polymer having an indicated Staudinger molecular weight number below about 20,000 does not cure into a material having a definite tensile strength; but instead, whatever curing agents are used, the material does not develop a tensile strength, but retains its property of cold flow. However, when the molecular weight is above about 20,000 the polymer can be cured, but the unprotected material becomes uncurable in a comparatively short length of time, whereas the protected material retains its curability for periods of several years when stored at room temperature in the general neighborhood of +)° C.

EXAMPLE 2

A copolymer of isobutylene and isoprene was prepared, as in Example 1, from a mixture of 97.5 parts of isobutylene of 97% purity and 2.5 parts of isoprene of 96% purity and finished by the procedure shown in Example 1, except that a continuous method of polymerization was used. The olefinic containing material and the catalyst solution were continuously fed to a reactor cooled externally with liquid ethylene, and the slurry of polymer was continuously withdrawn from the reactor. Samples of this polymer were then compounded with various polyalkylated phenols; with two mono-alkylated phenols for comparison standards; and one sample was left uncompounded. These various samples were then placed in the hot air oven at 110° C.; samples being taken at frequent intervals and tested for intrinsic viscosity to indicate the comparative molecular weight values. The polymer, as produced, showed a Staudinger molecular weight number of approximately 40,000, which, in each instance, was somewhat reduced by the milling necessary to incorporate the protective agent. The results are shown in the following Table II:

These results show the rapid deterioration of the unprotected polymer, the relatively more rapid deterioration of polymer containing the mono-substituted phenol, and the substantial protective action of the various di-substituted and tri-substituted alkyl phenols.

Compounding tests using the compounding formulae of Example I show that these samples, as originally prepared, cured excellently to a good tensile strength and elongation as long as the molecular weight was above 25,000 to 30,000.

It may be noted that these indicated Staudinger molecular weight numbers were determined by the viscosity of the polymer in diisobutylene solution, using the equation $$\text{Mol. wt.} = \frac{0.727 \times 10^6 \log \frac{\eta}{\eta_0}}{c}$$

where $\eta$ = viscosity of polymer solution, 20° C.
$\eta_0$ = viscosity of diisobutylene, 20° C.
$c$ = concn. in g./l. of polymer in diisobutylene.

EXAMPLE 3

A tri-polymer was prepared consisting of 40 parts of styrene, 60 parts of isobutylene, and 3 parts of isoprene by the procedure given in Example 1 except that more aluminum chloride in higher concentration in methyl chloride was required. This polymer was likewise divided into portions, one of which was protected by the presence of 0.25% of 4-methyl-2,6-di-tertiary-butyl phenol. Portions of the respective samples were placed in the air oven at 110° C. and the intrinsic viscosities taken at frequent intervals to indicate comparative molecular weights. The results are shown in Table III:

Table III

| Inhibitor | 0 hours | 96 hours | 198 hours | 294 hours |
|---|---|---|---|---|
| None | 16,300 | 12,600 | 3,100 | 3,300 |
| 0.25% 4-Methyl-2, 6-Di-t.-Butyl Phenol | 16,500 | 15,900 | 16,100 | 15,300 |

Thus the process of the invention yields a new composition of matter in the form of an isobutylenic or isobutylene-containing polymer in which the molecular weight and the potential tensile strength, elongation and modulus of the cured polymers are effectively maintained during storage of the uncured polymers.

It may be noted further that these phenolic stabilizers, as prepared, are clear white or only slightly colored substances which do not discolor Table II

| Inhibitor | Molecular Weight After Indicated Hours in Oven at 110° C. | | | | | | | |
|---|---|---|---|---|---|---|---|---|
| | 0 Hours | 48 Hours | 96 Hours | 114 Hours | 164 Hours | 168 Hours | 198 Hours | 288-294 Hours |
| None | 35,900 | | 12,300 | | | | 1,600 | 1,200 |
| 0.25% p-tert.-Amyl Phenol | 36,200 | | 5,100 | | | | 2,000 | 2,100 |
| 0.25% p-Cresol | 35,000 | 13,700 | 9,700 | | | | 2,300 | 1,600 |
| 0.25% 2,4-Di-t.-Amyl Phenol | 36,700 | | 13,600 | | | | 1,800 | 1,400 |
| 0.25% 2-Methyl-4-t.-Butyl Phenol | 39,700 | | | 20,300 | 12,500 | | | 2,600 |
| 0.25% 2,3-Dimethyl-6-t.-Butyl Phenol | 36,700 | 25,400 | 19,400 | | | 14,730 | | 2,400 |
| 0.25% 4-Methyl-2-t.-Butyl Phenol | 35,500 | | 32,200 | | | | 26,000 | 1,500 |
| 0.25% 4-Methyl-2-n-Butyl Phenol | 34,800 | | 31,800 | | | | 27,800 | 20,100 |
| 0.25% 2,4,6-Trimethyl Phenol | 35,500 | 32,900 | 30,600 | | | 27,600 | | 24,200 |
| 0.25% 2,4,6-Tri-t.-Butyl Phenol | 36,700 | 33,900 | 32,900 | | | 31,300 | | 27,700 |
| 0.25% 4-Methyl-2,6-Di-t.-Butyl Phenol | 35,200 | | 33,700 | | | | 33,700 | 32,500 |
| 0.25% 2,4-Dimethyl-6-t.-Butyl Phenol | 36,700 | | 35,000 | | | | 33,100 | 32,800 |
| 0.25% 4-Methyl-2,6-Di-t.-Butyl Phenol | 35,900 | | 33,800 | | | | | 34,000 |
| 0.50% 4-Methyl-2,6-Di-t.-Butyl Phenol | 36,700 | | 34,800 | | | | | 35,400 | the polymer, as is the case with other proposed protective agents, and accordingly this material can be used for protection of the molecular weight, where the maintenance of a clear white color is essential.

While there are above disclosed but a limited number of embodiments of the product and process of the invention, it is possible to produce still other embodiments without departing from the inventive concept herein disclosed and it is therefore desired that only such limitations be imposed on the appended claims as are stated therein or required by the prior art.

The invention claimed is:

1. A composition of matter comprising in combination a copolymer of isobutylene with a multi-olefin having from 4 to 6 carbon atoms per molecule and an indicated molecular weight above about 20,000 together with a polyalkylated monophenol having a methyl substituent in the para position and tertiary butyl substituents in both ortho positions.

2. A composition of matter comprising in combination a copolymer of isobutylene with a multi-olefin having from 4 to 6 carbon atoms per molecule and an indicated molecular weight above about 20,000 together with a polyalkylated monophenol having alkyl substituents in the 2, 4 and 6 positions.

3. A composition of matter comprising in combination a copolymer of isobutylene with a multi-olefin having from 4 to 6 carbon atoms per molecule and an indicated molecular weight above about 20,000 together with a polyalkylated monophenol having tertiary butyl substituents in the 2, 4 and 6 positions.

4. A composition of matter comprising in combination a cooplymer of isobutylene with a multi-olefin having from 4 to 6 carbon atoms per molecule and an indicated molecular weight above about 20,000 together with a polyalkylated monophenol having methyl substituents in the 2 and 4 positions and a tertiary butyl substituent in the 6 position.

JOSEPH F. NELSON.

REFERENCES CITED

The following references are of record in the file of this patent:

UNITED STATES PATENTS

| Number | Name | Date |
|---|---|---|
| 1,954,985 | Buc | Apr. 17, 1934 |
| 2,031,930 | Buc | Feb. 25, 1936 |
| 2,244,021 | Rosen | June 3, 1941 |
| 2,359,360 | Gibbs | Oct. 3, 1944 |